W. L. WALL.
HOLDER FOR EYEGLASSES AND SPECTACLES.
APPLICATION FILED MAY 11, 1914.
1,219,685.
Patented Mar. 20, 1917.
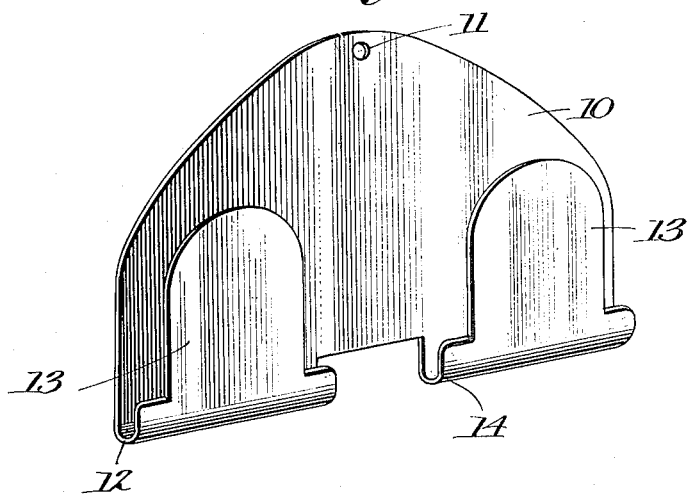
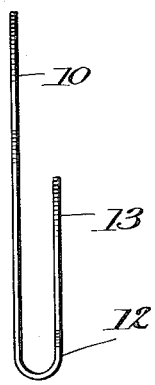
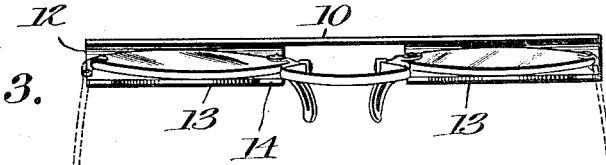

UNITED STATES PATENT OFFICE.

WILLIAM L. WALL, OF PHILADELPHIA, PENNSYLVANIA.

HOLDER FOR EYEGLASSES AND SPECTACLES.

1,219,685.

Specification of Letters Patent.

Patented Mar. 20, 1917.

Application filed May 11, 1914. Serial No. 837,913.

*To all whom it may concern:*

Be it known that I, WILLIAM L. WALL, citizen of the United States, residing at Philadelphia, in the county of Philadelphia and State of Pennsylvania, have invented certain new and useful Improvements in Holders for Eyeglasses and Spectacles; and I do hereby declare the following to be a full, clear, and exact description of the invention, such as will enable others skilled in the art to which it appertains to make and use the same.

This invention relates to improvements in holders for eye glasses and spectacles.

The object of the present invention is the provision of a holder of this character which is adapted to receive and support the glasses or spectacles, and at the same time to protect the glasses or spectacles against undue wear. When spectacles are placed in a case during the time they are out of service, the temples must be folded, and this has a tendency to wear the joints and impair the efficiency of adjustment. By the present invention it is sought to entirely overcome these defects, and thereby increase both the efficiency and lasting quality of the lenses.

The increasing cost of eye glass and spectacle lenses renders highly desirable the provision of a proper holder which will prevent breakage of the glasses, as commonly occurs when the same are laid upon a flat surface, and to this end the present invention has as a further object the production of a holder in which the glasses or spectacles are supported in an upright position, thereby conveniently to be grasped for removal from the holder.

It is a further object of the invention to provide a holder, in the nature of a rack, in which a pair of glasses or spectacles may be freely introduced, and from which they may be as readily removed, the construction being such that the bridge or nose piece will effectually coöperate with the holder to prevent displacement of the glasses or spectacles therefrom.

The invention will be better understood by reference to the accompanying drawings, and to the description hereto appended, wherein is illustrated and described what is believed to be a preferred form of the invention, but it will be understood that the latter is capable of embodiment in other forms than the specific adaptation herein disclosed, so that the invention is not to be restricted to the exact features of detail hereinafter set forth.

In the drawings—

Figure 1 is a perspective view of a holder for eye glasses and spectacles constructed in accordance with the present invention.

Fig. 2 is an end view thereof.

Fig. 3 is a top plan view, a pair of glasses being shown as supported by the holder, the dotted lines indicating the position assumed by the temples of a pair of spectacles when the holder supports the latter.

Referring now in detail to the drawings, the numeral 10 designates the body of the hereindescribed holder, this being in the form of an attenuated plate of extended area, and said plate is provided with an opening 11, preferably at its upper portion, to receive a suitable suspensory device such as a tack, nail, or its equivalent, whereby the holder may be hung on a wall or the like. The lower edge of the body 10 is provided with two upwardly extending integral spaced guards or flanges 13 lying substantially parallel with the main portion 10. These guards are spaced a sufficient distance from the body 10 to provide for the reception of lens of the usual thickness and that portion of the holder forming the junction between the guards and the body portion is rolled or curved to form a pair of alined U-shaped supporting lips or channels having a cut away portion 14 in the center thereof to provide an intermediate recess. Each guard 13 is preferably of less width than the lip or channel upon which it is formed thereby providing shoulders or stops adjacent each side of the guard, and by this arrangement it will be noted that the alined lips or channels have an intermediate space 14 therebetween somewhat smaller than the space between the guards themselves, thus making provision for the reception of the nose piece or bridge of the eye glasses or spectacles of any style or size. As is apparent, the upper ends of the guards 13 are free, and said guards may, therefore, yield with respect to the body 10, thus facilitating introduction and removal of the glasses to and from the holder.

In the use of the hereindescribed holder the same is hung on a wall by means of the opening 11, and when it is desired to support a pair of glasses or spectacles in the holder the same are introduced into the space between the body 10 and the guards 13, the lenses being positioned in rear of the guards. The nose piece or bridge of the glasses or spectacles will, therefore, enter the notch 14 between the guards 13, as clearly seen by reference to Fig. 3, and in certain styles of glasses will rest upon the adjacent inner shoulders or supports 14. The temples of the glasses pass outside of the guards and either rest directly upon them or lie over the shoulders 14 adjacent the outer edges of the guards. Therefore since the nose piece or bridge extends outwardly beyond the plane of the front face of the guards 13, and the temples extend beyond the guards, it will be evident that should the glasses be moved lengthwise of the holder, such movement will be limited either by reason of contact of the nose piece or bridge with inner shoulders of the guards or because of the contact of the temples with the outer shoulders thereof. This insures security of the glasses in the holder, and prevents displacement of the same and consequent breakage of the lenses. As hereinbefore stated, when the spectacles are placed in a case during the period they are not in use, the temples thereof must be folded, and this folding of the temples wears the joints and impairs accuracy of adjustment. By the present invention, however, this is entirely overcome, it being unnecessary to fold the temples, as clearly illustrated by the dotted lines in Fig. 3, the spectacles being securely held in the device, and the temples remaining in their open position ready for application to the wearer when the spectacles are removed from the holder.

The hereindescribed holder may be formed of any suitable material, such as celluloid, which permits the holder to be readily molded to the desired form, or it may be made of sheet metal, thereby enabling the same to be stamped and folded to the shape illustrated and described.

While the invention has been described as adapted for support from a wall, it might be suspended from the garment of an eye glass wearer.

Having thus described the invention, what is claimed as new, and desired to be secured by Letters Patent, is:

An eye glass holder comprising a body portion, a pair of supporting channels struck up from said body portion and formed in alinement, and a guard rising from each channel; a central cut away portion between said channels and a shoulder at each side of each of said guards formed at the junction of the guard with the supporting channel; said shoulders being so arranged that the outer two will be adapted to form a rest and stop for the temples of an eyeglass adapted to be used in connection with the holder, and the inner shoulders being so arranged as to provide a rest and stop for the nose piece of the eye glass, whereby any lateral movement of the eyeglass will be limited, and the guards being of such width and height as to substantially cover the exposed surface of the eyeglass lens.

In testimony whereof I affix my signature, in the presence of two witnesses.

WILLIAM L. WALL.

Witnesses:
J. HARRY BOWERS,
FRANK E. BOWERS.